(12) United States Patent
Yoneyama

(10) Patent No.: US 8,495,063 B2
(45) Date of Patent: Jul. 23, 2013

(54) RECORDING MEDIUM AND PLAYBACK DEVICE

(75) Inventor: Kazuto Yoneyama, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/179,668

(22) Filed: Jul. 11, 2011

(65) Prior Publication Data

US 2011/0271188 A1    Nov. 3, 2011

Related U.S. Application Data

(63) Continuation of application No. 10/731,235, filed on Dec. 8, 2003, now Pat. No. 7,984,051.

(30) Foreign Application Priority Data

Jul. 10, 2003 (JP) .................. 2003-194693

(51) Int. Cl.
G06F 17/30 (2006.01)
H04L 12/58 (2006.01)

(52) U.S. Cl.
CPC ............. H04L 12/58 (2013.01); *Y10S 707/913* (2013.01)
USPC ........... 707/736; 707/770; 707/781; 707/812; 707/913

(58) Field of Classification Search
CPC ....................................................... H04L 12/58
USPC ............. 707/1, 100, 104, 736, 770, 781, 812, 707/913; 386/95, 125, 1, 45; 725/51, 112
See application file for complete search history.

(56) References Cited

U.S. PATENT DOCUMENTS

| | | | |
|---|---|---|---|
| 6,247,022 B1 | 6/2001 | Yankowski | |
| 6,345,017 B1 | 2/2002 | Inoue | |
| 6,356,971 B1 | 3/2002 | Katz et al. | |
| 6,580,870 B1 * | 6/2003 | Kanazawa et al. | 386/240 |
| 6,785,463 B2 * | 8/2004 | Yamauchi et al. | 386/230 |
| 6,973,451 B2 | 12/2005 | Laronne et al. | |
| 7,082,407 B1 | 7/2006 | Bezos et al. | |
| 7,167,857 B2 | 1/2007 | Roberts | |
| 7,171,018 B2 | 1/2007 | Rhoads et al. | |
| 7,191,190 B2 | 3/2007 | Dabiqua et al. | |
| 7,227,971 B2 | 6/2007 | Nagao | |
| 7,308,485 B2 | 12/2007 | Roberts et al. | |
| 7,313,809 B1 | 12/2007 | Mohan et al. | |

(Continued)

FOREIGN PATENT DOCUMENTS

| | | |
|---|---|---|
| JP | 11-313283 A | 11/1999 |
| JP | 2002-125183 A | 4/2002 |

(Continued)

*Primary Examiner* — Dangelino Gortayo
(74) *Attorney, Agent, or Firm* — Kilpatrick Townsend Stockton LLP

(57) ABSTRACT

To provide user-friendly information recording and playback, embodiments of the invention provide a recording medium having recorded therein audiovisual information; content identification information for identifying the audiovisual information; and locator information. In one embodiment, a playback device comprises a recording medium control module configured to read content identification information from a recording medium for identifying content of audiovisual information and locator information relating to the audiovisual information in the recording medium. The locator information relates to the audiovisual information for locating a provider of service information. A network control module is configured to connect with the provider of service information based on the locator information.

6 Claims, 5 Drawing Sheets

U.S. PATENT DOCUMENTS

| | | |
|---|---|---|
| 7,610,359 B2 | 10/2009 | Yoon et al. |
| 7,639,923 B2 * | 12/2009 | Ikeda et al. ............... 386/335 |
| 7,640,569 B2 * | 12/2009 | Kitajima ..................... 725/115 |
| 2003/0161615 A1 * | 8/2003 | Tsumagari et al. ......... 386/95 |
| 2003/0231861 A1 * | 12/2003 | Yoo et al. .................... 386/46 |
| 2004/0002997 A1 | 1/2004 | Naples |
| 2004/0181816 A1 | 9/2004 | Kim et al. |
| 2004/0236588 A1 | 11/2004 | Millard et al. |
| 2005/0071425 A1 | 3/2005 | Chung et al. |
| 2005/0193425 A1 * | 9/2005 | Sull et al. .................... 725/135 |
| 2005/0203992 A1 | 9/2005 | Tanaka et al. |
| 2007/0168463 A1 | 7/2007 | Rothschild |

FOREIGN PATENT DOCUMENTS

| | | |
|---|---|---|
| JP | 2002-229892 | 8/2002 |
| JP | 2003-150632 A | 5/2003 |
| WO | WO01/15164 A1 | 3/2001 |
| WO | WO01/71708 A1 | 9/2001 |

* cited by examiner

RECORDING MEDIUM AND PLAYBACK DEVICE

CROSS-REFERENCES TO RELATED APPLICATIONS

This application is a continuation application of U.S. patent application Ser. No. 10/731,235, filed on Dec. 8, 2003, which claims priority from Japan Patent Application No. 2003-194693, filed on Jul. 10, 2003, the entire disclosure of which is incorporated herein by reference.

BACKGROUND OF THE INVENTION

1. Field of the Invention

The present invention relates to technology for recording and playing back information. In particular, the present invention relates to recording and playback technology having a communication device connected to a server.

2. Description of the Related Art

Content such as music and video is recorded in a recording medium such as a CD or a DVD (Digital Versatile Disc) and handled in commerce. Particularly in recent years, service contents, which are data such as clips showing how a video was made and games and video clips advertising movies scheduled for release, are often included in DVD videos of movie content. These service contents sometimes become obsolete depending on the period.

Thus, technology has recently been proposed where ID information of content recorded in a recording medium (referred to below as a content ID) is recorded in the recording medium, the content ID is transmitted to a service server when a recording and playback device plays back the recording medium, additional information of the content (e.g., words of a song or a profile of a singer if the content is that of music) searched on the basis of the ID of the content is received from the service server, and the additional information is played or recorded in the recording medium or the like (see, e.g., JP-A-2002-269900).

In the above-described conventional technology, the user has had to search in advance for the address of the service server of the transmission destination, access the service server, and acquire additional information relating to the content.

However, consideration has not been given to acquiring additional information relating to the content recorded in the recording medium without the user's searching for the address of the service server.

Further, in the above-described conventional technology, it has been necessary to generate discrimination information from the content ID recorded in the recording medium and connect to a dedicated service server, and it has been difficult to accommodate new service developments of the content provider.

Moreover, in the above-described conventional technology, there has been the problem that, the additional information relating to the content recorded in the recording medium which is being obtained has already been accessed previously and thus the effort of obtaining the information is not needed or useful.

BRIEF SUMMARY OF THE INVENTION

Embodiments of the present invention provide user-friendly information recording and playback technology and a recording medium.

In accordance with an aspect of the invention, a recording medium has recorded therein information comprising audiovisual information; content identification information for identifying content of the audiovisual information; and locator information relating to the audiovisual information for locating a provider of service information.

In accordance with another aspect of this invention, a playback device comprises a recording medium control module configured to read content identification information from a recording medium for identifying content of audiovisual information and locator information relating to the audiovisual information in the recording medium. The locator information relates to the audiovisual information for locating a provider of service information. A network control module is configured to connect with the provider of service information based on the locator information.

In accordance with another aspect of the present invention, a playback device comprises a network control module configured to send content identification information identifying content of audiovisual information of a recording medium to a provider of service information which is associated with locator information in the recording medium relating to the audiovisual information of the recording medium, and to receive from the provider service information containing audiovisual information corresponding to the content identification information. A database control module is configured to store content identification information relating to audiovisual information. A playback control module is configured to output information to a display device to display information. The playback control module generates distinction information distinguishing, from the service information received from the provider, between audiovisual information of content identification information not registered in the management database and audiovisual information registered in the management database, and outputs the distinction information to the display device.

DETAILED DESCRIPTION OF THE INVENTION

Embodiments of the invention will be described below. It should be noted that, although a DVD will be described as an example of a recording medium in the embodiments, the invention is not limited thereto and can also be adapted to other recording media that record information, such as a hard disk, an MD (Mini Disc), a CD (Compact Disc), a magnetic disk, or a semiconductor memory.

Figure 1:
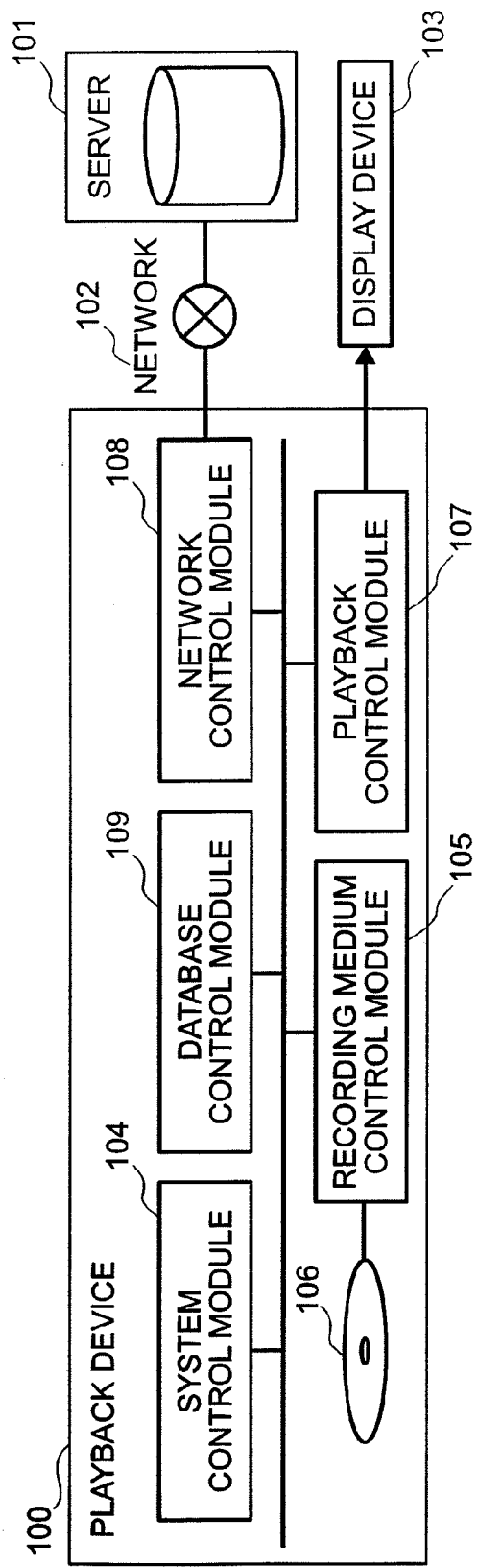
FIG. 1 is a system diagram showing a mode where a playback device and a server are connected according to an embodiment of the invention.

FIG. 1 is a block diagram showing a connection between a playback device according to an embodiment of the invention and a server.

In FIG. 1, a playback device 100 is coupled to a server 101 via a network 102 and to a display device 103. The display device 103 may be integrated with the playback device 100. A system control module 104 in the playback device 100 controls the overall operation of the device 100.

A system control module 104 includes a CPU and a database control module 109 includes a memory in which is recorded a management database (described in a second embodiment). The system control module 104 controls various processing and various devices for playback, and monitors the statuses of the power supply and peripheral devices. The memory in the database control module 109 may be a nonvolatile memory or a Flash Memory, or may be a portable recording medium such as an optical disc, a magnetic disk, a magneto-optical disk, or a semiconductor memory.

A recording medium control module 105 conducts data reading control from a DVD 106. A playback control module 107 converts data read by the recording medium control module 105 to a displayable format, superposes an OSD (On Screen Display) as needed, and outputs the data to the display device 103. A network control module 108 is connected to the server 101 via the network 102 and controls the transmission and reception of data in accordance with the URL read from the DVD 106 and URLs registered in advance in devices. A database control module 109 registers and manages, in a memory, information such as a content ID and a content URL read from the DVD 106.

Figure 2:
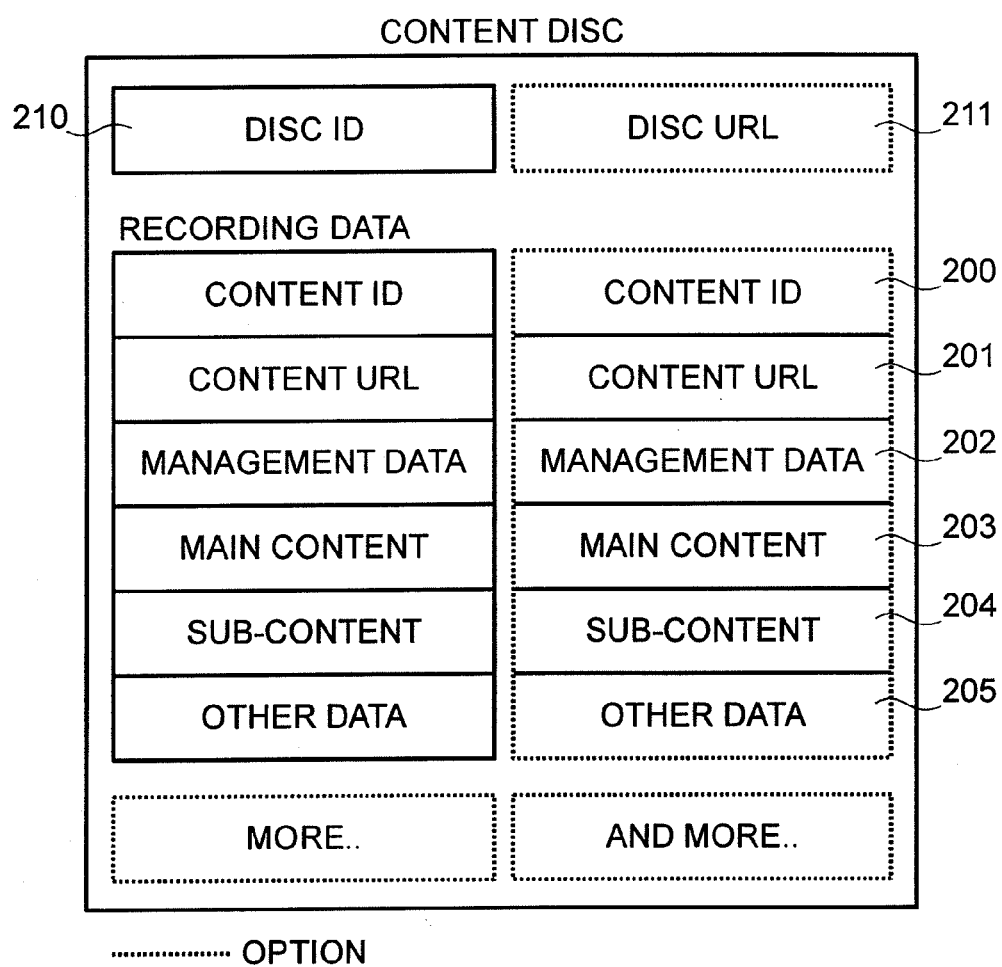
FIG. 2 is a diagram showing the configuration of recording data of content read by the playback device according to an embodiment of the invention.

FIG. 2 is a diagram showing an example of a configuration of data recorded in a DVD handled by the playback device 100. The DVD is a content disc having a disc ID 210 and a disc URL 211. In FIG. 2, reference numeral 200 represents a content ID. Usually, a unique ID is given and recorded with respect to content recorded in a DVD. This ID is sent to a server and the server discriminates the content of the user, whereby the ID can be used to supply information matching the user. Alternatively, information received from the server is referenced with the content ID 200 by the playback device so that a UI (User Interface), which is provided to the user if there is overlapping information or the like, can be realized. Reference numeral 201 represents a content URL and records connection destination information for a content provider to provide a service. Reference numeral 202 represents management data in which is recorded information for managing content and the like described below. Reference numeral 203 represents main content in which is recorded the content of a movie if the content is that of a movie. In a case where the content is audiovisual information, it may be of a configuration where it is compressed in MPEG (Moving Picture Expert Group) format and recorded. Reference numeral 204 represents sub-content. For example, if the main content is movie content, a director's cut (collection of scenes not utilized at the time the movie was edited), making-of-the-movie clips (content documenting the process of making the movie at the time of shooting or the time of creation), or bloopers (collection of scenes in which the actors made mistakes) are recorded. Reference numeral 205 represents other data in which are recorded additional information relating to the content, data used in content-specific menu display and data selected from the menu and played. FIG. 2 shows two sets of recording data associated with two content IDs in the content disc, but there may be one set of more than two sets of recording data in other embodiments.

Figure 3:
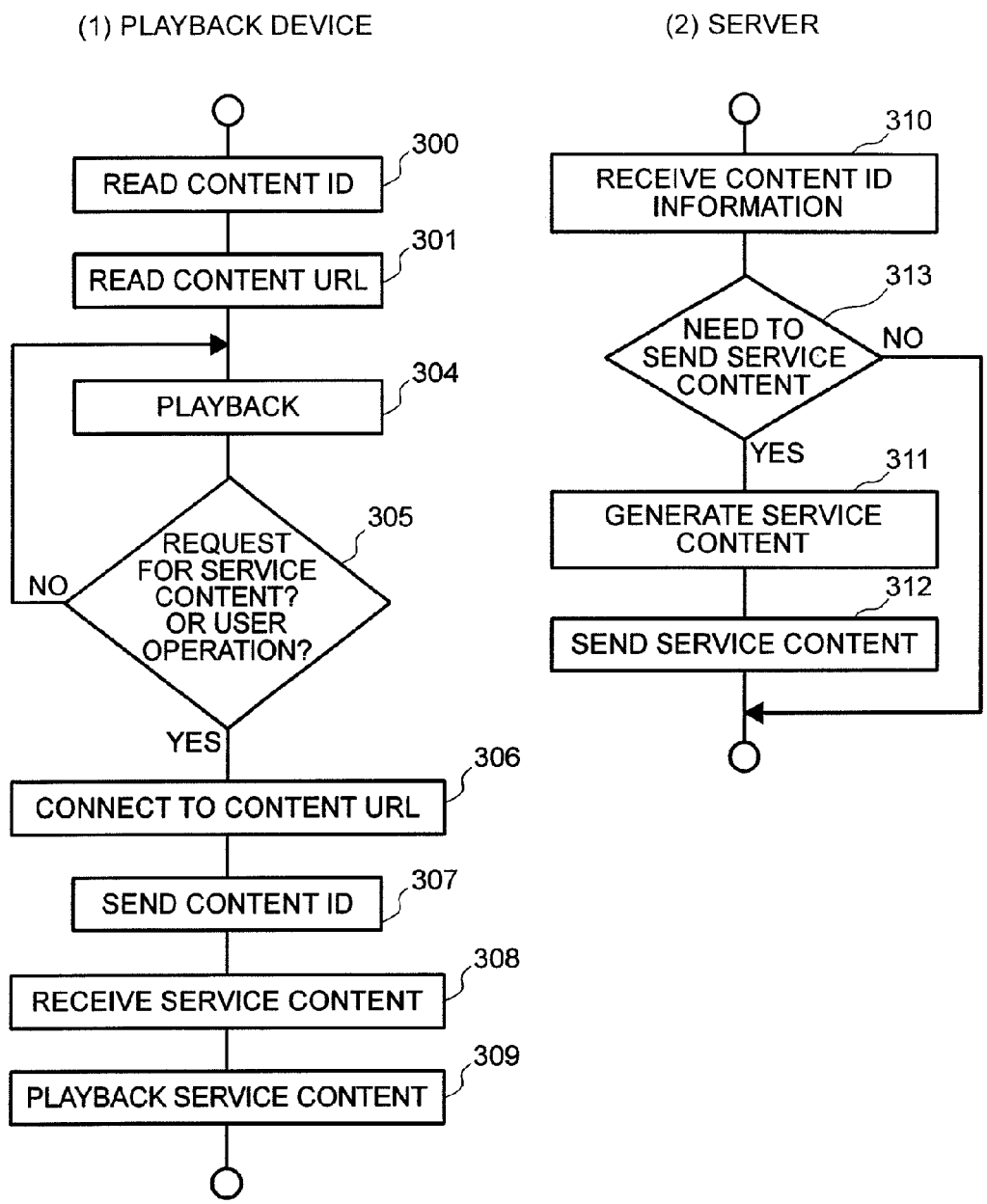
FIG. 3 is a diagram showing processing flows of the playback device and the server according to one embodiment of the invention.

FIG. 3 is a diagram showing processing flows at the time of content playback by the playback device 100 and at the time of server connection according to the first embodiment. In FIG. 3, process (1) represents the processing flow at the time of content playback by the playback device and connection to the server. Process (2) represents the processing flow at the time of connection by the server.

In FIG. 3 (1), in step 300, the recording medium control module 105 reads the content ID 200 from the DVD 106. Next, in step 301, the recording medium control module 105 reads the content URL 201 from the DVD 106. Thereafter, in step 304, the system control module 104 conducts ordinary playback in the playback control module 107 from the data that the recording medium control module 105 has read.

In step 305, the system control module 104 determines whether or not there is a request to play or acquire service content. When it is determined that there is a request, the network control module 108 connects to a connection destination represented by the content URL 201 in step 306.

The request to play or acquire service content may be determined by storing in advance, in the recording medium (region of 205 in FIG. 2), information representing the fact that the service content is to be played or information representing the fact that the service content is to be acquired, and then playing this back. The user may also be prompted to input the request.

Next, in step 307, the network control module 108 sends the content ID 200 to the server 101. In step 308, the network control module 108 receives the service content supplied from the server 101. In step 309, the system control module 104 appropriately sends the received data to the playback control module 107 from the service content that was received or is being received in step 308, so that the service content is played back.

In FIG. 3 (2), in step 310, the server 101 receives the content ID 200 sent from the playback device 100 in step 307. In step 313, a determination is made as to whether it is necessary to send the service content. For instance, if the service content to be sent is the same as the service content associated with the content ID already registered in the playback device 100, the server 101 will not send the service content. Next, in step 311, the server 101 selects service content corresponding to the content ID 200, and reads or generates information to send to the playback device 100. Thereafter, in step 312, the server 101 sends the service content to the playback device 100.

According to the above, it becomes possible for the user to connect to a service providing site without having to conduct cumbersome operations like inputting a connection destination URL in order to obtain service content. Also, the URLs of dedicated service providing sites can be set per content, whereby it becomes possible for the content provider to easily provide user-friendly services specialized for the user who purchased the content. For example, even if the content that the user is playing is old, it becomes possible to provide service content matching the time the content is played or the class of content, and the user can use, at any time, service content that matches periods and trends. Thus, the embodiment can contribute to business development of the content provider and to improvements in user-friendliness.

Also, in the present embodiment, by including the function of reading not only the content ID recorded in the recording medium but also the additional information such as the URL (Uniform Resource Locator) for connecting to the server and connecting to the server and the function of sending the content ID, it becomes easy for the content provider to determine and provide service information matching the user.

Next, a second embodiment will be described with reference to FIG. 5. In this embodiment, processing flows at the time of content playback by the playback device and at the time of server connection will be described.

Figure 5:
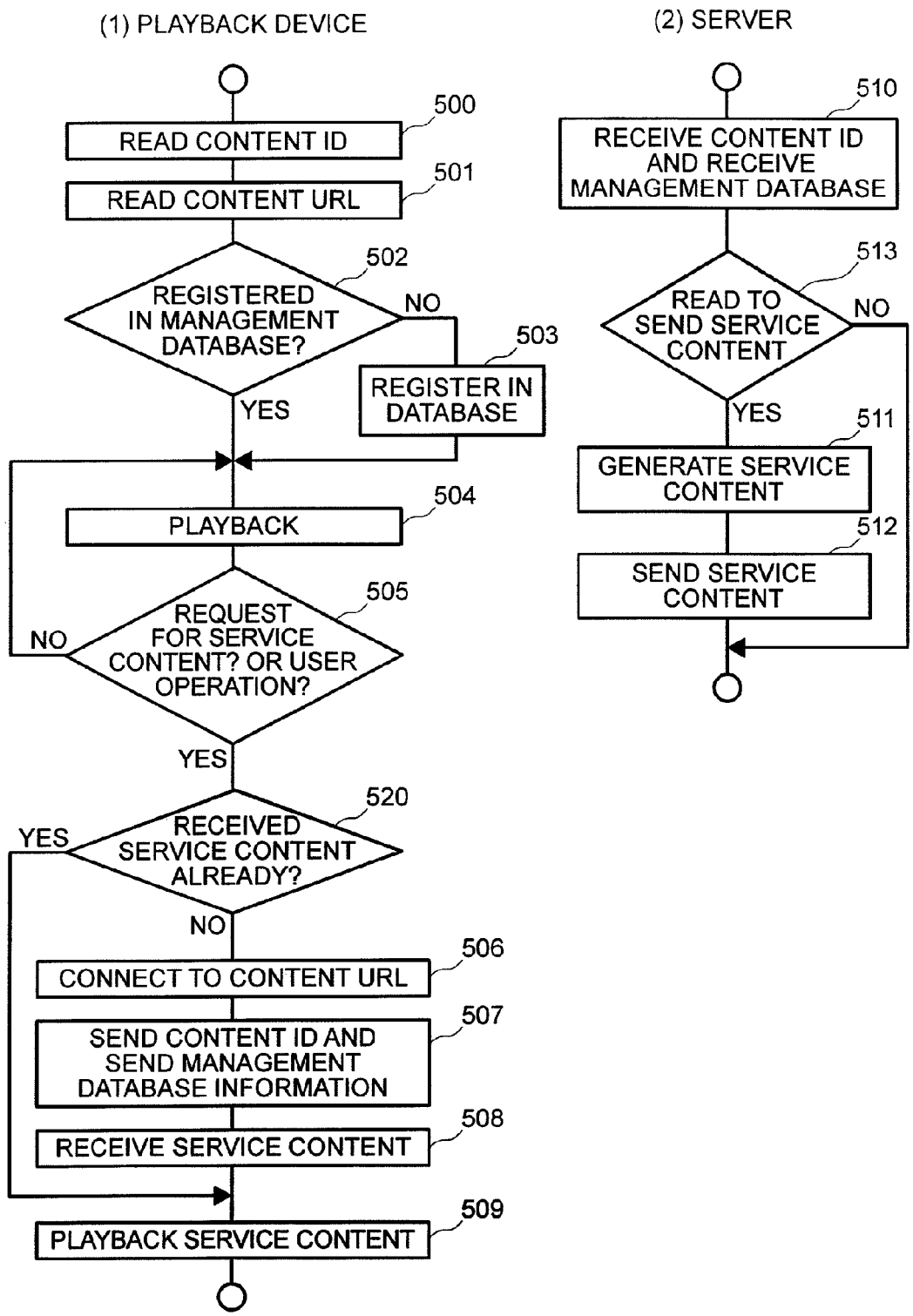
FIG. 5 is a diagram showing processing flows of the playback device and the server according to another embodiment of the invention.

In FIG. 5 (1), in step 500, the recording medium control module 105 reads the content ID 200 from the DVD 106. Next, in step 501, the recording medium control module 105 reads the content URL 201 from the DVD 106. In this second embodiment, in step 502, when the database control module 109 determines that the content ID 200 and the content URL 201 are not registered in the management database recorded in the memory that the database control module 109 has, in step 503, the database control module 109 registers these in the database. Thereafter, in step 504, ordinary playback is conducted. Because steps 504 and 505 are the same as steps 304 and 305 of the first embodiment, description thereof will be omitted.

Steps 506-509 are the same as steps 306-309 in FIG. 3; and steps 510-512 are the same as steps 310-312 in FIG. 3. In FIG. 5, an additional step 520 is provided between step 505 and step 506. In step 520, the system control module 104 determines whether the service content has already been received. If so, steps 506-508 are skipped, and playback of the service content already received occurs at step 509. If not, steps 506-509 are executed.

The content ID registered in the management database is not limited to the content ID of the content read from the recording medium. A content ID of content acquired via the network may also be registered. Also, the user may register the content ID. By configuring the embodiment in this manner, more content that the user has already previewed and more content that the user already owns can be registered.

Also, in the present embodiment, the playback device 100 may be configured to send another content ID registered in the management database to the server when the playback device sends the content ID 200 to the server.

Additionally, the server 101 also selects, reads or generates service content relating to the other content ID and sends the same to the playback device 100. Here, plural content IDs may be sent to the server 101, and the content ID 200 of the content of the loaded recording medium and the other content IDs do not have to be distinguished. By configuring the embodiment in this manner, more service contents can be sent from the server and the playback device can receive the same.

Moreover, the server 101 selects service content corresponding to the content ID 200, and searches for a corresponding relationship between other content IDs and the selected service content before the server 101 sends the selected service content to the playback device 100. Additionally, in a case where the server 101 is attempting to send service content relating to the content of another content ID, it is determined that the service content to be sent is the service content of the content itself of the content ID already registered in the playback device. As a result, the service content is not sent to the playback device.

For example, it will be assumed that a first movie is recorded in the DVD 106 and that the content ID 200 indicates the fact that it is the first movie. It will also be assumed that the content ID of a second movie is already registered in the management database. In this case, the playback device is configured to send not only the content ID 200 but also the content ID of the second movie to the server. Additionally, when the server 101 sends the service content in regard to the second movie as the service content corresponding to the content ID 200, the service content in regard to the second movie is not sent to the playback device 100 because the content ID of the second movie is already registered in the playback device 100. Thus, it is possible to avoid having the server send the service content of the content itself of the content ID already registered in the playback device to the playback device.

According to the above, it becomes possible for the user to connect to a service providing site without having to conduct cumbersome operations like inputting a connection destination URL in order to obtain service content. Also, the URLs of dedicated service providing sites can be set per content, whereby it becomes possible for the content provider to not only easily provide user-friendly services specialized for the user who purchased the content but also utilize information of the content that the user owns to supply user-friendly service content. These may be supplied as a function of the server or supplied as a function of the playback device.

Figure 4:
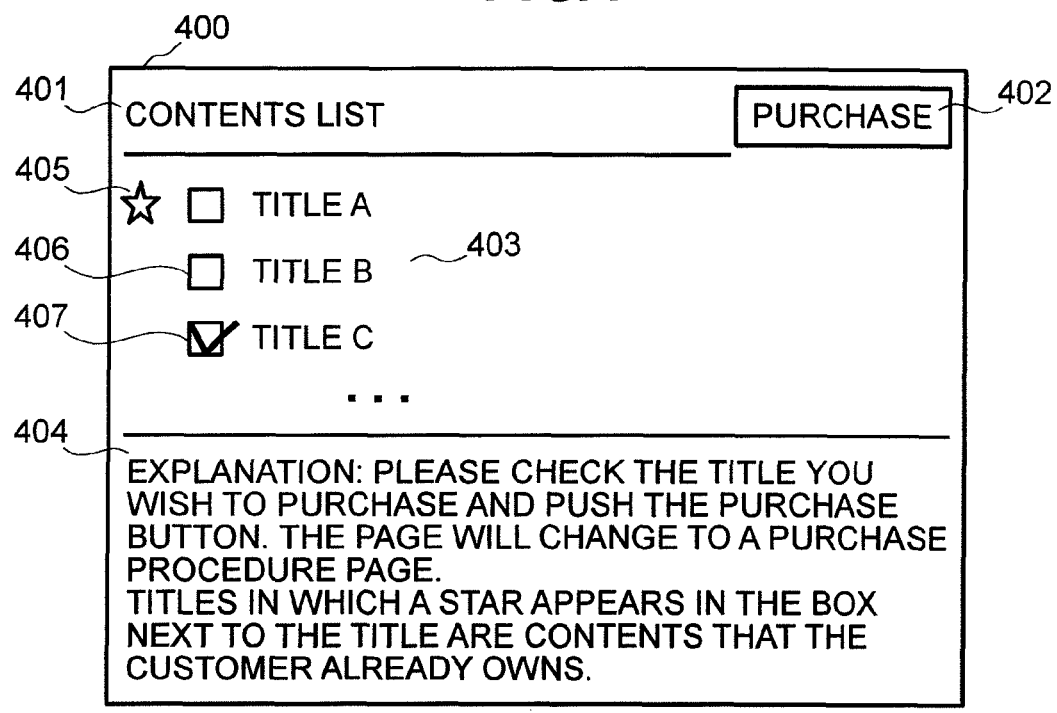
FIG. 4 is an example of a service screen provided by the playback device and the server.

FIG. 4 shows an example of a service screen at the time the playback device 100 is connected to the server. In FIG. 4, reference numeral 400 represents an example of a screen for a content purchasing service provided via the network. Reference numeral 401 represents a title of the service screen, and a title briefly representing the content of the service of the screen is displayed. Here, because the screen is a content purchasing screen, "Contents List" is displayed. Reference numeral 402 is a button for moving to a purchasing screen in regard to an item that the user has selected. Reference numeral 403 represents a list of titles relating to contents that the service provider provides. Reference numeral 404 represents an operating instructions display on the screen currently being displayed. Reference numeral 405 is an icon display representing the fact that a title is one that the user already owns. It should be noted that, in regard to the contents that the user already owns, title display does not have to be conducted and the contents do not have to be received from the server.

Reference numerals 406 and 407 represent check boxes for setting titles that the user intends to purchase. Reference numeral 406 represents a title that is not a purchase target, and reference numeral 407 represents a title that is a purchase target.

According to the embodiment, by managing plural content IDs in this manner, it becomes possible to use, with a user-friendly UI, conventionally closed services that could be used only in relation to sites used in the past, regardless of the service site and even if it is the first time that the user is using the service. It also becomes possible for the content provider to provide, with respect to a first-time user, services offering recommended titles matching preferences.

It should be noted that, although a configuration was described in the present embodiment where the playback device registered the management database, the same effects can be obtained even with a configuration where the server registers the management database.

As described above, according to the present embodiment, by including the function of reading not only the content ID recorded in the DVD but also additional information such as a URL for connecting to a server and connecting to the server and the function of sending the content ID, it becomes easy for the content provider to determine and supply service information matching the user. Also, by registering and managing the content ID and other additional information in the database, the content provider can utilize this for the development of many service provisions. Embodiments of the present invention can provide user-friendly information recording and playback technology and a recording medium. It is noted that the various modules in the playback device may be configured in hardware or in software which is stored in a computer readable medium to be executed by a processor such as the CPU in the system control module 104.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A method of a playback device for reproducing a content recorded on a recording medium, the method comprising:

reproducing audiovisual content, content identification information for identifying the audiovisual content, universal resource locator (URL) information for indicating a location of a related content which is related to the audiovisual content, menu data for displaying a first title menu of the audiovisual content on a menu screen, and additional data which includes state information which represents either one of a first state to direct the related content to be downloaded or a second state to direct the related content to be downloaded and played back, the additional data being recorded on the recording medium;

reproducing and extracting the additional data from the recording medium, the additional data is accessed to control the operations, such that, the related content is directed to be downloaded if the additional data includes the state information which represents the first state, and the related content is directed to be downloaded and played back if the additional data includes the state information which represents the second state;

displaying the first title menu of the audiovisual content on the menu screen by reproducing the menu data from the recording medium;

displaying a second title menu for acquiring the related content on the menu screen;

determining whether the additional data is for downloading the related content or for downloading and playing back the related content, by reproducing the additional data which includes the state information representing either one of the first state or the second state;

if the additional data includes the state information which represents the first state that the related content is to be downloaded when a user selects a title related to the audiovisual content in the displayed second menu, connecting with a server, automatically after the reproduction of the additional data, using the URL, sending the content identification information to the server information and downloading the related content from the server;

if the additional data includes the state information which represents the second state that the related content is to be downloaded and played back when a user selects the title related to the audiovisual content in the displayed second menu, connecting with the server, automatically after the reproduction of the additional data, using the URL information, sending the content identification information to the server, downloading the related content from the server, automatically playing back the related content which is downloaded from the server, and outputting the related content to a display of the user; and if the related content corresponding to the content identification information which the server receives is registered in the playback device, the playback device does not receive the related content corresponding to the content identification information GP and information which indicates that the related content is registered in the playback device is displayed in the second title menu.

2. A method of a playback device for reproducing a content recorded on a recording medium, the method comprising:

reproducing audiovisual content, content identification information for identifying the audiovisual content, universal resource locator (URL) information for indicating a location of a related content which is related to the audiovisual content, menu data for displaying a first title menu of the audiovisual content on a menu screen, and additional data which includes state information which represents either one of a first state to direct the related content to be downloaded or a second state to direct the related content to be downloaded and played back, the additional data being recorded on the recording medium;

reproducing and extracting the additional data from the recording medium, the additional data is accessed to control the operations, such that, the related content is directed to be downloaded if the additional data includes the state information which represents the first state, and the related content is directed to be downloaded and played back if the additional data includes the state information which represents the second state;

displaying the first title menu of the audiovisual content on a menu screen by reproducing the menu data from the recording medium;

displaying a second menu for acquiring the related content on the menu screen;

determining whether the additional data is for downloading the related content or for downloading and playing back the related content, by reproducing the additional data which includes the state information representing either one of the first state or the second state;

if the additional data includes the state information which represents the first state that the related content is to be downloaded when the menu screen is displayed in accordance with the additional data and a user selects the title from the second menu, connecting with a server, automatically after the reproduction of the additional data, using the URL information, sending the content identification information to the server information and downloading the related content from the server;

if the additional data includes the state information which represents the second state that the related content is to be downloaded and played back when the menu screen is displayed in accordance with the additional data and a user selects the title from the second menu, connecting with the server, automatically after the reproduction of the additional data, using the URL information, sending the content identification information to the server, downloading the related content from the server, automatically playing back the related content which is downloaded from the server, and outputting the related content to a display of the user; and if the related content corresponding to the content identification information which the server receives is registered in the playback device, the playback device does not receive the related content corresponding to the content identification information GP and information which indicates that the related content is registered in the playback device is displayed in the second title menu.

3. A method of a playback device for recording a content on a recorded medium comprising:

recording an audiovisual content, content identification information for identifying the audiovisual content, recording a URL information indicating a location of a related content relating to the audiovisual content;

recording a first menu data for displaying a first title menu of the audiovisual content on a menu screen, recording a second menu data for displaying a second title menu for acquiring the related content on the menu screen, and recording additional data which includes state information which represents either one of a first state to direct the related content to be downloaded or a second state to direct the related content to be downloaded and played back, the additional data being recorded on the recording medium;

wherein the additional data on the recording medium is reproduced and extracted by a reproducing device;

wherein the first title menu of the audiovisual content is displayed on a menu screen by reproducing the menu data from the recording medium;

wherein the second menu for acquiring the related content is displayed on the menu screen;

wherein the additional data is accessed to control an operation, such that the related content is directed to be downloaded if the additional data includes the state information which represent the first state, and the related content is directed to be downloaded and played back if the additional data includes the state information which represents the second state;

wherein whether the additional data is for downloading the related content or downloading and playing back the related content is determined by reproducing the additional data which includes the state information representing either one of the first state or the second state;

wherein the URL information and the additional data are used for connecting with a server, downloading the related content from the server when a menu screen is displayed in accordance with the additional data and a user selects a title from the second menu, if the additional data includes the state information which represents the first state that the related content is to be downloaded;

wherein the URL information and the additional data are used for connecting with a server, downloading the related content from the server when the menu the screen is displayed in accordance with the additional data and the user selects a title from the second menu, automatically playing back and outputting the related content which is downloaded from the server to a display of the user, if the additional data includes the state information which represents the second state that the related content is to be downloaded; and if the related content corresponding to the content identification information which the server receives is registered in the playback device, the playback device does not receive the related content corresponding to the content identification information GP and information which indicates that the related content is registered in the playback device is displayed in the second title menu.

4. An apparatus of a playback device for reproducing a content recorded on a recording medium, the apparatus is configured to:

reproduce audiovisual content, content identification information for identifying the audiovisual content, universal resource locator (URL) information for indicating a location of a related content which is related to the audiovisual content, menu data for displaying a first title menu of the audiovisual content on a menu screen, and additional data which includes state information which represents either one of a first state to direct the related content to be downloaded or a second state to direct the related content to be downloaded and played back, the additional data being recorded on the recording medium;

reproduce and extract the additional data from the recording medium, the additional data is accessed to control the operations, such that, the related content is directed to be downloaded if the additional data includes the state information which represents the first state, and the related content is directed to be downloaded and played back if the additional data includes the state information which represents the second state;

display the first title menu of the audiovisual content on the menu screen by reproducing the menu data from the recording medium;

display a second title menu for acquiring the related content on the menu screen;

determine whether the additional data is for downloading the related content or for downloading and playing back the related content, by reproducing the additional data which includes the state information representing either one of the first state or the second state;

if the additional data includes the state information which represents the first state that the related content is to be downloaded when a user selects a title related to the audiovisual content in the displayed second menu, then connect with a server, automatically after the reproduction of the additional data, using the URL information, sending the content identification information to the server information and download the related content from the server;

if the additional data includes the state information which represents the second state that the related content is to be downloaded and played back when a user selects the title related to the audiovisual content in the displayed second menu, then connect with the server, automatically after the reproduction of the additional data, using the URL information, sending the content identification information to the server, download the related content from the server, automatically playing back the related content which is downloaded from the server, and output the related content to a display of the user; and if the related content corresponding to the content identification information which the server receives is registered in the playback device, the playback device does not receive the related content corresponding to the content identification information GP and information which indicates that the related content is registered in the playback device is displayed in the second title menu.

5. An apparatus of a playback device for reproducing a content recorded on a recording medium, the apparatus is configured to:

reproduce audiovisual content, content identification information for identifying the audiovisual content, universal resource locator (URL) information for indicating a location of a related content which is related to the audiovisual content, menu data for displaying a first title menu of the audiovisual content on a menu screen, and additional and data which includes state information which represents either one of a first state to direct the related content to be downloaded or a second state to direct the related content to be downloaded and played back, the additional data being recorded on the recording medium;

reproduce and extract the additional data from the recording medium, the additional data is accessed to control the operations, such that, the related content is directed to be downloaded if the additional data includes the state information which represents the first state, and the related content is directed to be downloaded and played back if the additional data includes the state information which represents the second state;

display the first title menu of the audiovisual content on a menu screen by reproducing the menu data from the recording medium;

display a second menu for acquiring the related content on the menu screen;

determine whether the additional data is for downloading the related content or for downloading and playing back the related content, by reproducing the additional data which includes the state information representing either one of the first state or the second state;

if the additional data includes the state information which represents the first state that the related content is to be downloaded when the menu screen is displayed in accordance with the additional data and a user selects the title from the second menu, then connect with a server, automatically after the reproduction of the additional data, using the URL information, sending the content identification information to the server information and download the related content from the server;

if the additional data includes the state information which represents the second state that the related content is to be downloaded and played back when the menu screen is displayed in accordance with the additional data and a user selects the title from the second menu, then connect with the server, automatically after the reproduction of the additional data, using the URL information, sending the content identification information to the server, download the related content from the server, automatically playing back the related content which is downloaded from the server, and output the related content to a display of the user; and if the related content corresponding to the content identification information which the server receives is registered in the playback device, the playback device does not receive the related content corresponding to the content identification information GP and information which indicates that the related content is registered in the playback device is displayed in the second title menu.

6. An apparatus of a playback device for recording a content on a recorded medium, the apparatus is configured to:

record an audiovisual content, content identification information for identifying the audiovisual content, record a URL information indicating a location of a related content relating to the audiovisual content;

record a first menu data for displaying a first title menu of the audiovisual content on a menu screen, record a second menu data for displaying a second title menu for acquiring the related content on the menu screen, and record additional data which includes state information which represents either one of a first state to direct the related content to be downloaded or a second state to direct the related content to be downloaded and played back, the additional data being recorded on the recording medium;

wherein the additional data on the recording medium is reproduced and extracted by a reproducing device;

wherein the additional data is accessed to control an operation, such that the related content is directed to be downloaded if the additional data includes the state information which represent the first state, and the related content is directed to be downloaded and played back if the additional data includes the state information which represents the second state;

wherein the first title menu of the audiovisual content is displayed on a menu screen by reproducing the menu data from the recording medium;

wherein the second menu for acquiring the related content is displayed on the menu screen;

wherein whether the additional data is for downloading the related content or downloading and playing back the related content is determined by reproducing the additional data which includes the state information representing either one of the first state or the second state;

wherein the URL information and the additional data are used to connect with a server, download the related content from the server when a menu screen is displayed in accordance with the data and a user selects a title from the second menu, if the additional data includes the state information which represents the first state that the related content is to be downloaded;

wherein the URL information and the additional data are used to connect with a server, download the related content from the server when the menu the screen is displayed in accordance with the additional data and the user selects a title from the second menu, automatically playing back and outputting the related content which is downloaded from the server to a display of the user, if the additional data includes the state information which represents the second state that the related content is to be downloaded; and if the related content corresponding to the content identification information which the server receives is registered in the playback device, the playback device does not receive the related content corresponding to the content identification information GP and information which indicates that the related content is registered in the playback device is displayed in the second title menu.

* * * * *